(12) United States Patent
Kumagai et al.

(10) Patent No.: US 11,379,303 B2
(45) Date of Patent: Jul. 5, 2022

(54) MEMORY SYSTEM AND METHOD

(71) Applicant: Kioxia Corporation, Tokyo (JP)

(72) Inventors: Yukie Kumagai, Yokohama (JP);
Hajime Yamazaki, Kawasaki (JP);
Akihiro Nagatani, Yokohama (JP);
Haruka Mori, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/118,913

(22) Filed: Dec. 11, 2020

(65) Prior Publication Data

US 2021/0397512 A1 Dec. 23, 2021

(30) Foreign Application Priority Data

Jun. 17, 2020 (JP) .............................. JP2020-104680

(51) Int. Cl.
| | | |
|---|---|---|
| *G06F 11/10* | (2006.01) | |
| *G06F 11/07* | (2006.01) | |
| *G06F 11/30* | (2006.01) | |
| *G06F 7/58* | (2006.01) | |
| *G06F 3/06* | (2006.01) | |

(52) U.S. Cl.
CPC ........ *G06F 11/1068* (2013.01); *G06F 3/0619* (2013.01); *G06F 3/0623* (2013.01); *G06F 3/0659* (2013.01); *G06F 3/0679* (2013.01); *G06F 7/582* (2013.01); *G06F 11/076* (2013.01); *G06F 11/3037* (2013.01)

(58) Field of Classification Search
CPC .... G06F 7/582; G06F 11/3037; G06F 3/0679; G06F 3/0659; G06F 11/1068; G06F 3/0623; G06F 11/076; G06F 3/0619
See application file for complete search history.

(56) References Cited

U.S. PATENT DOCUMENTS

| | | | |
|---|---|---|---|
| 10,230,401 B2* | 3/2019 | Watanabe | H03M 13/2927 |
| 2006/0195762 A1* | 8/2006 | Back | H04L 1/0071 |
| | | | 714/758 |
| 2013/0219247 A1* | 8/2013 | Yang | G06F 13/16 |
| | | | 714/766 |
| 2017/0168741 A1* | 6/2017 | Carter | G06F 11/00 |
| 2018/0102182 A1* | 4/2018 | Zhou | G06F 11/1068 |

(Continued)

FOREIGN PATENT DOCUMENTS

| | | |
|---|---|---|
| JP | 63-298777 A | 12/1988 |
| JP | 07-261943 A | 10/1995 |
| JP | 2013-214212 A | 10/2013 |

*Primary Examiner* — Guy J Lamarre
(74) *Attorney, Agent, or Firm* — Oblon, McClelland, Maier & Neustadt, L.L.P.

(57) ABSTRACT

According to one embodiment, a controller executes a first operation. The first operation includes reading a plurality of data units from a nonvolatile memory and executing a process on the read plurality of data units. The process includes an inverse conversion of a conversion applied to the plurality of data units and first decoding using the plurality of data units that has executed the inverse conversion. The controller acquires first information from one of the plurality of data units that has executed the first operation. The controller compares the acquired first information with an expected value of the first information and re-executes the first operation when the acquired first information and the expected value are not equal to each other.

20 Claims, 12 Drawing Sheets

(56) References Cited

U.S. PATENT DOCUMENTS

| | | | |
|---|---|---|---|
| 2019/0146705 A1* | 5/2019 | Lin | G06F 3/0647 711/103 |
| 2021/0303715 A1* | 9/2021 | Zalivaka | G06F 21/602 |

* cited by examiner

FIG.5

| PAGE NUMBER | | | |
|---|---|---|---|
| 0 | RSF | RSF | RSF |
| 1 | DU0 | DU0 | DU0 |
| 2 | DU1 | DU1 | DU1 |
| ... | DU2 | DU2 | DU2 |
| j | ... | ... | ... |
| ... | DUj | DUj | DUj |
| n-2 | ... | ... | ... |
| n-1 | DU(n-2) | DU(n-2) | DU(n-2) |
| n | DU(n-1) | DU(n-1) | DU(n-1) |
| n+1 | RSP0 | RSP0 | RSP0 |
| | RSP1 | RSP1 | RSP1 |
| | PF0 / IEP / PF1 / IEP / PF2 / IEP / PF3 / IEP | | |

MEMORY SYSTEM AND METHOD

CROSS-REFERENCE TO RELATED APPLICATIONS

This application is based upon and claims the benefit of priority from Japanese Patent Application No. 2020-104680, filed on Jun. 17, 2020; the entire contents of which are incorporated herein by reference.

FIELD

Embodiments described herein relate generally to a memory system and a method.

BACKGROUND

A conventionally known memory system is equipped with a nonvolatile memory such as a NAND flash memory. Such a memory system may execute coding for error correction across a plurality of data units in writing to the nonvolatile memory. In decoding corresponding to the coding, the data units are read from the nonvolatile memory and used. However, such decoding corresponding to the coding may not be able to restore data to be error-corrected to state of its original data.

BRIEF DESCRIPTION OF THE DRAWINGS

FIG. 5 is a schematic diagram illustrating an example of a method for storing RS code frames according to the embodiment;

DETAILED DESCRIPTION

In general, according to one embodiment, a memory system includes a nonvolatile memory and a controller. The nonvolatile memory stores a plurality of first data units. The plurality of first data units corresponds to a plurality of second data units that has executed a first process. The first process includes first coding that generates first parity data based on the plurality of second data units and first conversion executed after the first coding. Each of the plurality of second data units includes first information. The controller is configured to execute a first operation. The first operation includes reading the first data units from the nonvolatile memory and executing a second process on a plurality of third data units, the plurality of third data units corresponding to the read plurality of first data units. The second process includes second conversion and first decoding, the second conversion being inverse conversion of the first conversion, the first decoding using the first parity data and the plurality of third data units that has executed the second conversion. The controller acquires second information from a fourth data unit. The second information corresponds to the first information of the fourth data unit. The fourth data unit is one of a plurality of fifth data units. The plurality of fifth data units corresponds to the plurality of third data units that has executed the first operation. The controller is configured to compare third information that is an expected value of the second information, with the second information acquired from the fourth data unit. The controller is configured to re-execute the first operation when the third information and the second information are not equal to.

Exemplary embodiments of a memory system and a method will be explained below in detail with reference to the accompanying drawings. The present invention is not limited to the following embodiments.

Embodiment

Figure 1:
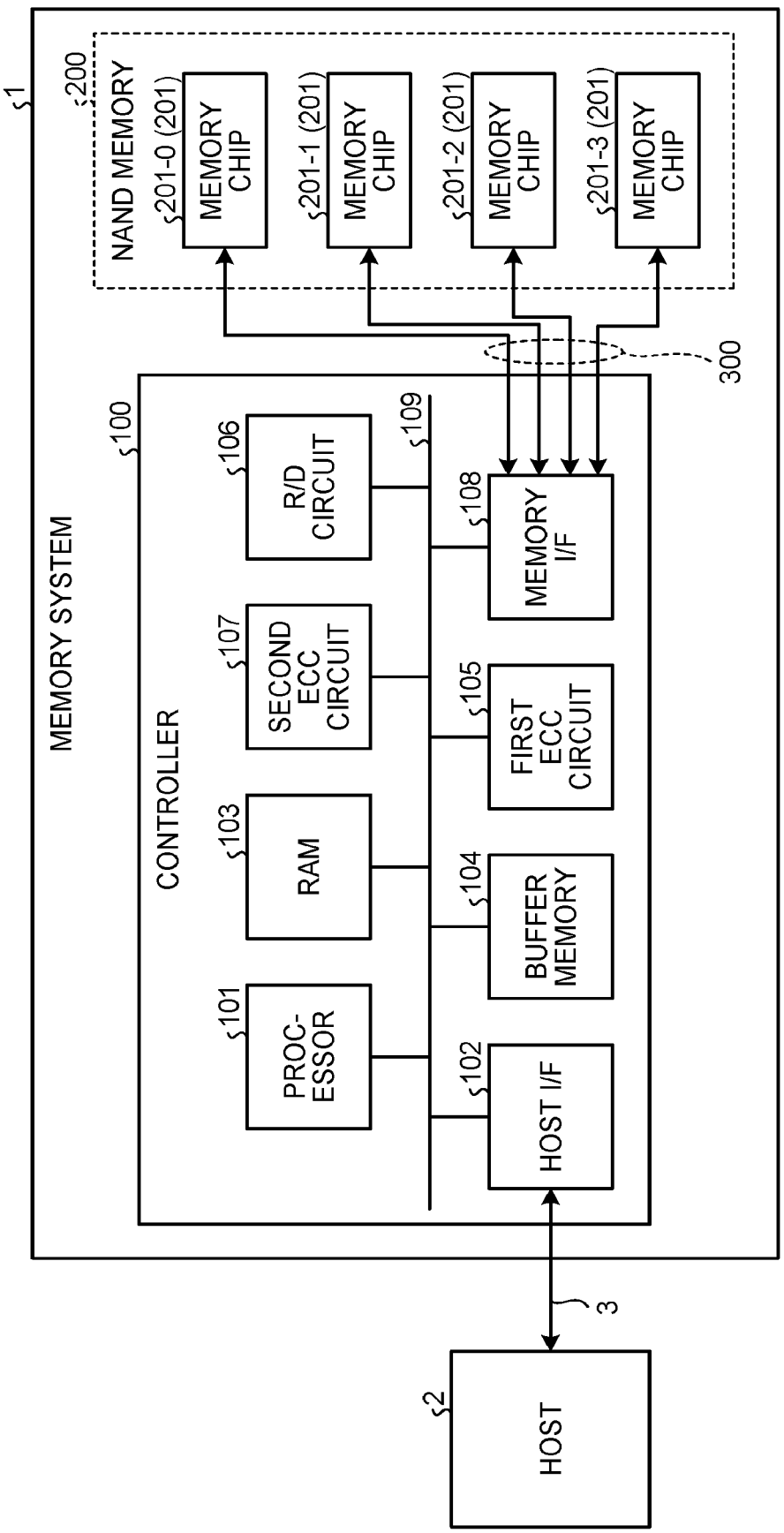
FIG. 1 is a schematic diagram illustrating an example of a configuration of a memory system according to an embodiment.

FIG. 1 is a schematic diagram illustrating an example of a configuration of a memory system according to an embodiment. A memory system 1 is connected to a host 2 through a communication interface 3. The host 2 is, for example, a personal computer, a personal digital assistant, a server, or a processor mounted on the personal computer, the personal digital assistant, or the server. The host 2 uses the memory system 1 as an external storage device. The communication interface 3 is compliant with, for example, the SATA, SAS, or PCIe (registered trademark) standard.

The memory system 1 receives an access command (e.g., a write command or a read command) from the host 2. The memory system 1 stores user data requested to be written in response to the write command. The memory system 1 transmits user data request to be read in response to the read command to the host.

The access command can include a logical address. The memory system 1 provides the host 2 with a logical address space. The logical address indicates a location in the logical address space. The host 2 designates a location where user data is written or a location where user data is read by using the logical address. In other words, the logical address is locational information designated by the host 2.

The memory system 1 includes a controller 100 and a NAND memory 200. The controller 100 is connected to the NAND memory 200 through a memory bus 300. The controller 100 controls, for example, data transfer between the host 2 and the NAND memory 200. The NAND memory 200 is configured to store, for example, user data in a nonvolatile manner.

The NAND memory 200 includes one or more memory chips 201. In the embodiment, as an example, the NAND memory 200 includes four memory chips 201-0, 201-1, 201-2, and 201-3.

Figure 2:
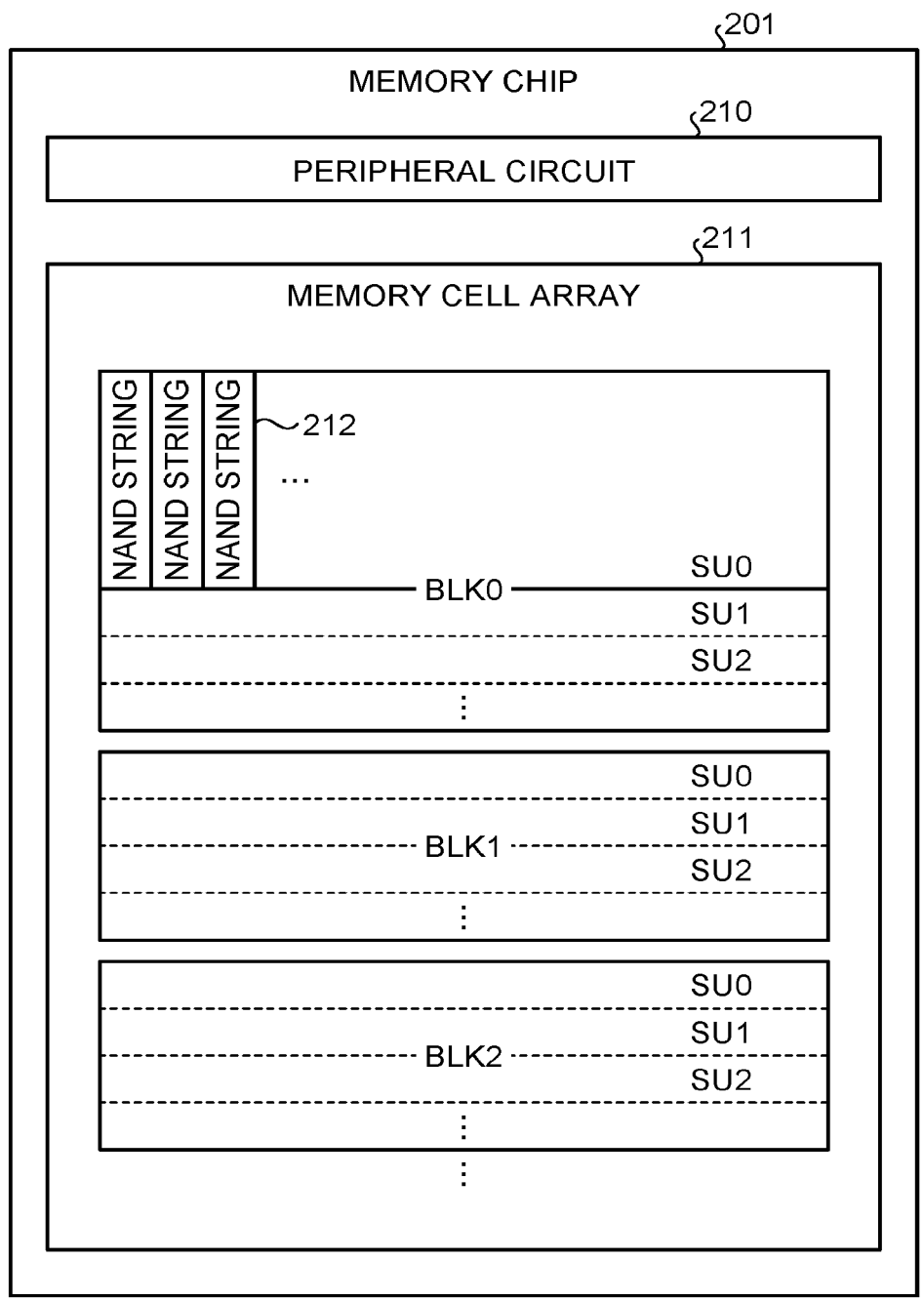
FIG. 2 is a schematic diagram illustrating a configuration example of a memory chip according to the embodiment.

FIG. 2 is a schematic diagram illustrating a configuration example of the memory chip 201 according to the embodiment. The memory chip 201 includes a peripheral circuit 210 and a memory cell array 211.

The memory cell array 211 includes a plurality of blocks BLK (BLK0, BLK1, BLK2, . . . ) each of which is a set of nonvolatile memory cell transistors. Each of the blocks BLK includes a plurality of string units SU (SU0, SU1, SU2, . . . ) each of which is a set of memory cell transistors associated with word lines and bit lines. Each of the string units SU includes a plurality of NAND strings 212 each of which includes a plurality of memory cell transistors connected in series. The string unit SU includes any number of NAND strings 212.

The peripheral circuit 210 includes, for example, a row decoder, a column decoder, a sense amplifier, a latch circuit, and a voltage generation circuit. In response to an instruction from the controller 100, the peripheral circuit 210 executes an operation corresponding to the instruction on the memory cell array 211. The instruction from the controller 100 includes write, read, and erasure.

Figure 3:
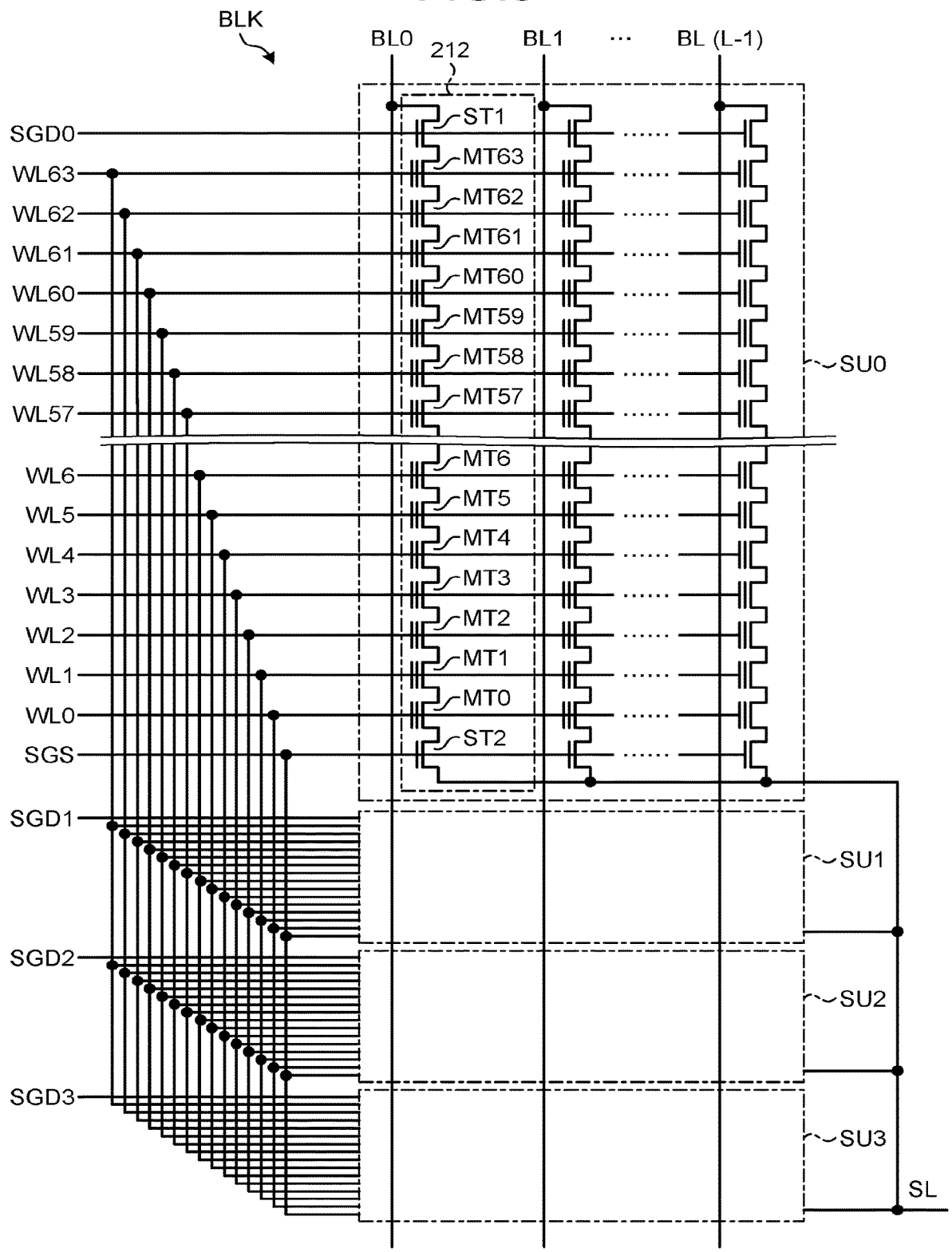
FIG. 3 is a schematic diagram illustrating a circuit configuration of a block according to the embodiment.

FIG. 3 is a schematic diagram illustrating a circuit configuration of the block BLK according to the embodiment. All the blocks BLK are identical in configuration. The block BLK includes, for example, four string units SU0 to SU3. Each of the string units SU includes a plurality of NAND strings 212.

Each of the NAND strings 212 includes, for example, 64 memory cell transistors MT (MT0 to MT63) and selection transistors ST1 and ST2. The memory cell transistor MT includes a control gate and a charge storage layer, and stores data in a nonvolatile manner. The 64 memory cell transistors MT (MT0 to MT63) are connected in series between a source of the selection transistor ST1 and a drain of the selection transistor ST2. The memory cell transistor MT may be a MONOS memory cell transistor including an insulating film as the charge storage layer or an FG memory cell transistor including a conductive film as the charge storage layer. The number of memory cell transistors MT in the NAND string 212 is not limited to 64.

Gates of the selection transistors ST1 in the string units SU0 to SU3 are respectively connected to selection gate lines SGD0 to SGD3. On the other hand, gates of the selection transistors ST2 in the string units SU0 to SU3 are, for example, connected in common to a selection gate line SGS. The gates of the selection transistors ST2 in the string units SU0 to SU3 may be respectively connected to different selection gate lines SGS0 to SGS3 (not illustrated) for each string unit SU. The control gates of the memory cell transistors MT0 to MT63 in one block BLK are connected in common to word lines WL0 to WL63.

Drains of the selection transistors ST1 of the NAND strings 212 in the string unit SU are connected, in one-to-one correspondence, to different bit lines BL (BL0 to BL (L−1), where L is a natural number equal to or larger than 2). The bit line BL connects the corresponding NAND strings 212 in the string units SU in common between the blocks BLK. Sources of the selection transistors ST2 are connected in common to a source line SL.

That is, the string unit SU is a set of a plurality of NAND strings 212 which are connected, in one-to-one correspondence, to different bit lines BL and connected to a common selection gate line SGD. The block BLK is a set of a plurality of string units SU sharing word lines WL. The memory cell array 211 is a set of a plurality of blocks BLK sharing at least one common bit line BL.

The peripheral circuit 210 can collectively execute write and read on memory cell transistors MT that are connected to one word line WL in one string unit SU. A group of memory cell transistors MT that are collectively selected in write and read is denoted as a memory cell group MCG. A unit of a collection of pieces of 1-bit data to be written to or read from one memory cell group MCG is denoted as a page.

The peripheral circuit 210 executes erasure in an unit of a block BLK. That is, all pieces of data stored in one block BLK are collectively erased.

The configuration illustrated in FIGS. 2 and 3 is an example. The configuration of the memory cell array 211 is not limited to the configuration described above. For example, the memory cell array 211 may have a configuration in which NAND strings 212 are two-dimensionally or three-dimensionally arranged.

In write to the memory cell array 211, the peripheral circuit 210 injects charge in an amount corresponding to data into the charge storage layer of each of the memory cell transistors MT constituting a page to be written. In read from the memory cell array 211, the peripheral circuit 210 reads data corresponding to the amount of charge stored in the charge storage layer from each of the memory cell transistors MT constituting a page to be read.

However, the amount of charge in the charge storage layer may not reach a desired amount in write, or the amount of charge in the charge storage layer may unintentionally fluctuate after write. In such a case, data read from the memory cell transistor MT includes an error.

The controller 100 previously protects data to be transmitted to the NAND memory 200 with an error correction code so that, even when the data read from the memory cell transistor MT includes an error, the error can be corrected. The controller 100 performs error correction with the error correction code on the data read from the NAND memory 200.

Figure 4:
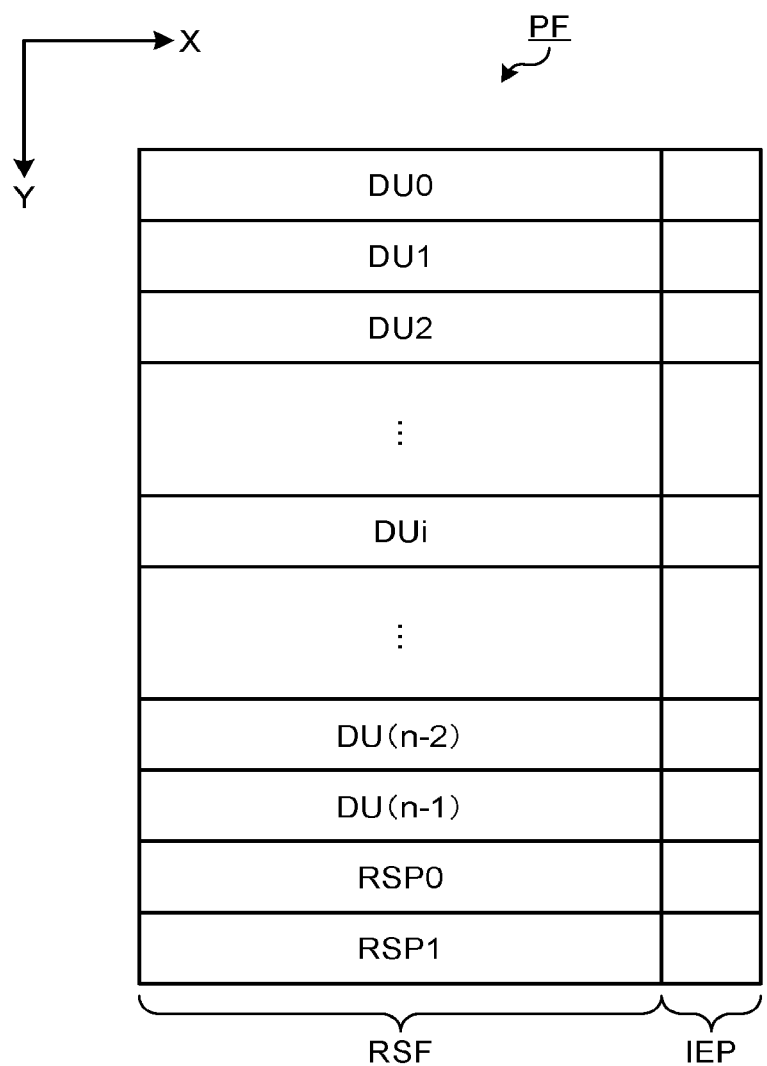
FIG. 4 is a schematic diagram illustrating an example of a configuration of a product code frame according to the embodiment.

In the embodiment, a product code that is a combination of two error correction codes is used. FIG. 4 is a schematic diagram illustrating an example of a configuration of a product code frame according to the embodiment.

User data is stored, as one or more data units DU divided in the size of the unit of coding, into the NAND memory 200. The product code protects n data units DU. Note that n is an integer equal to or larger than 2.

In FIG. 4, an X direction denotes a direction in which bits constituting one data unit DU are arrayed, and a Y direction denotes a direction which is perpendicular to the X direction and in which the data units DU are arrayed. The direction in which bits constituting one data unit DU are arrayed, that is, the X direction in FIG. 4 is also referred to as an in-line direction. The n data units DU are illustrated in a state arrayed in the Y direction. The (i+1)th data unit DU from the top in the Y direction is denoted as a data unit DUi. Note that i is an integer from zero to (n−1).

First, coding with a first error correction code is applied to the n data units DU0 to DU(n−1). The n data units DU0 to DU(n−1) are encoded with the first error correction code in a direction extending across the data units DU (that is, the Y direction).

In the embodiment, as an example, the first error correction code is a Reed-Solomon (RS) code. The first error correction code is not limited to the RS code. Any systematic code can be employed as the first error correction code.

Parity data RSP is generated by the coding with the first error correction code. For example, the parity data RSP includes two pieces of parity data RSP0 and RSP1 each of which has the same size as each data unit DU.

Hereinbelow, each of the data units DU0 to DU(n−1), the parity data RSP0, and the parity data RSP1 is also referred to as an RS code frame RSF.

After the coding with the first error correction code, the RS code frames RSF are individually encoded with a second error correction code. That is, each of the RS code frames RSF is encoded with the second error correction code in the in-line direction.

In the embodiment, as an example, the second error correction code is a Bose-Chaudhuri-Hocquenghem (BCH) code. The second error correction code is not limited to the BCH code. Any systematic code can be employed as the second error correction code. The second error correction code may be a combination of codes. The combination of codes as the second error correction code may include, for example, an error detection code such as a Cyclic Redundancy Check (CRC) code.

Parity data IEP is generated by the coding with the second error correction code. The parity data IEP is connected, in the in-line direction, to the RS code frame RSF as a source from which the parity data IEP is generated. Furthermore, (n+2) RS code frames RSF each of which is connected with the parity data IEP constitute one product code frame PF. Being connected can also be referred to as being added or being attached.

The RS code frames RSF constituting one product code frame PF are stored in different pages of the NAND memory 200. FIG. 5 is a schematic diagram illustrating an example of a method for storing the RS code frames RSF according to the embodiment.

In the example illustrated in FIG. 5, four product code frames PF0 to PF3 are stored in a group including (n+2) pages. In each of the (n+2) pages, four RS code frames RSF belonging to different product code frames PF and four pieces of parity data IEP corresponding one-to-one to the four RS code frames RSF are stored. The (n+2) pages are identified by page numbers from zero to (n+1). A page with the page number j is denoted as a page #j. Note that j is an integer from zero to (n+1).

Among the (n+2) RS code frames RSF constituting one product code frame PF, the n data units DU are stored in a distributed manner in n pages from the page #0 to the page #(n−1). Among the (n+2) RS code frames RSF, the parity data RSP0 is stored in the page #n, and the parity data RSP1 is stored in the page #(n+1).

The method for storing the RS code frames RSF is not limited to the example illustrated in FIG. 5. For example, the number of RS code frames RSF stored in each page is not limited to four.

A method for selecting the (n+2) pages in which the (n+2) RS code frames RSF constituting one product code frame PF are stored is not limited to any particular selection method. For example, the (n+2) pages in which the (n+2) RS code frames RSF constituting one product code frame PF are stored may be selected from one block BLK or may be selected from a plurality of blocks BLK. The (n+2) pages in which the (n+2) RS code frames RSF constituting one product code frame PF are stored may be selected from different blocks BLK. The (n+2) pages in which the (n+2) RS code frames RSF constituting one product code frame PF are stored may be selected from different memory chips 201.

Randomization is performed on each RS code frame RSF transmitted to the NAND memory 200 to reduce an error rate. The randomization makes values of data in the block BLK have no periodicity, thereby reducing interference between memory cell transistors MT. This reduces the error rate. Details of the randomization will be described later.

The NAND memory 200 corresponds to the nonvolatile memory. The data unit DU stored in the NAND memory 200 corresponds to the first data unit. That is, the NAND memory 200 stores a plurality of first data units. The data unit DU before being transmitted to the NAND memory 200 corresponds to the second data unit.

The coding with the first error correction code (e.g., the RS code in the embodiment) corresponds to the first coding. The parity data RSP corresponds to the first parity data. The second error correction code (e.g., the BCH code in the embodiment) corresponds to a second coding. The parity data IEP corresponds to a second parity data. The randomization corresponds to the first conversion.

Description will be made referring back to FIG. 1.

The controller 100 includes a processor 101, a host interface (host I/F) 102, a random access memory (RAM) 103, a buffer memory 104, a first error check and correction (ECC) circuit 105, a randomization and derandomization (R/D) circuit 106, a second ECC circuit 107, a memory interface (memory I/F) 108, and an internal bus 109. The processor 101, the host I/F 102, the RAM 103, the buffer memory 104, the first ECC circuit 105, the R/D circuit 106, the second ECC circuit 107, and the memory I/F 108 are electrically connected to the internal bus 109.

The controller 100 may be configured as a System-on-a-Chip (SoC). The controller 100 may include a plurality of chips. The RAM 103 or the buffer memory 104 may be disposed outside the controller 100.

The host I/F 102 outputs, to the internal bus 109, an access command and user data that are received from the host 2. The user data is transmitted to the buffer memory 104 via the internal bus 109.

The host I/F 102 transmits, to the host 2, user data read from the NAND memory 200 and a response from the processor 101.

The buffer memory 104 temporarily stores user data received from the host I/F 102 via the internal bus 109. Moreover, the buffer memory 104 temporarily stores user data read from the NAND memory 200. The host I/F 102 transmits, to the host 2, user data that is read from the NAND memory 200 and that is stored in the buffer memory 104.

For example, a volatile memory such as a static random access memory (SRAM) or a synchronous dynamic random access memory (SDRAM) can be employed as the buffer memory 104. The type of the memory employed as the buffer memory 104 is not limited to these types.

The memory I/F 108 controls a process of writing user data or the like to the NAND memory 200 and a process of reading user data or the like from the NAND memory 200 in accordance with an instruction from the processor 101.

The first ECC circuit 105 is configured to execute coding with the first error correction code (e.g., the RS code in the embodiment) on write data or the like. The first ECC circuit 105 is configured to execute decoding with the first error correction code (e.g., the RS code in the embodiment) on read data or the like.

The second ECC circuit 107 is configured to execute coding with the second error correction code (e.g., the BCH code in the embodiment) on write data or the like. The second ECC circuit 107 is configured to execute decoding with the second error correction code (e.g., the BCH code in the embodiment) on read data or the like.

The R/D circuit 106 is configured to execute randomization and derandomization.

The processor 101 executes a computer program. The processor 101 is, for example, a central processing unit (CPU). The processor 101 executes a firmware program while using the RAM 103 as a working memory, thereby performing centralized control of the elements of the memory system 1.

For example, when the processor 101 receives an access command from the host 2 via the host I/F 102, the processor 101 performs control in accordance with the access command. Specifically, the processor 101 instructs the memory I/F 108 to perform writing to the NAND memory 200 in accordance with a write command from the host 2. Moreover, the processor 101 instructs the memory I/F 108 to perform reading from the NAND memory 200 in accordance with a read command from the host 2.

When the processor 101 receives a write command from the host 2, the processor 101 determines a storage area (storage location) in the NAND memory 200 for user data corresponding to the write command. A correspondence between a logical address of user data and a physical address indicating a storage area of the user data is recorded in logical-physical conversion information. After determining the storage area of the user data, the processor 101 updates the logical-physical conversion information at a predetermined timing corresponding to the timing of writing the user data into the NAND memory 200.

When the processor 101 receives a read command from the host 2, the processor 101 converts a logical address designated by the read command to a physical address using the above logical-physical conversion information and instructs the memory I/F 108 to perform reading from a storage area indicated by the logical address.

Before user data is written into the NAND memory 200, the processor 101 controls various processes including coding on the user data. After user data is read from the NAND memory 200, the processor 101 controls various processes including error correction on the user data.

Figure 6:
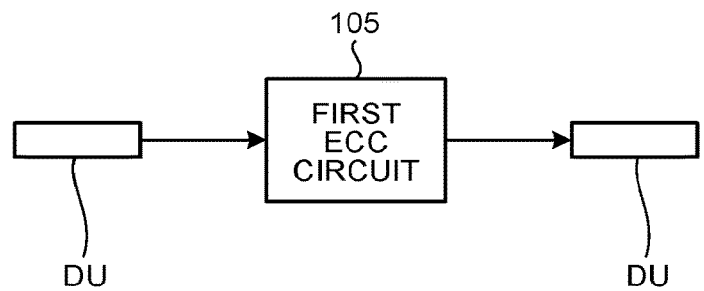
FIG. 6 is a diagram illustrating a process executed by a first ECC circuit according to the embodiment.
Figure 7:
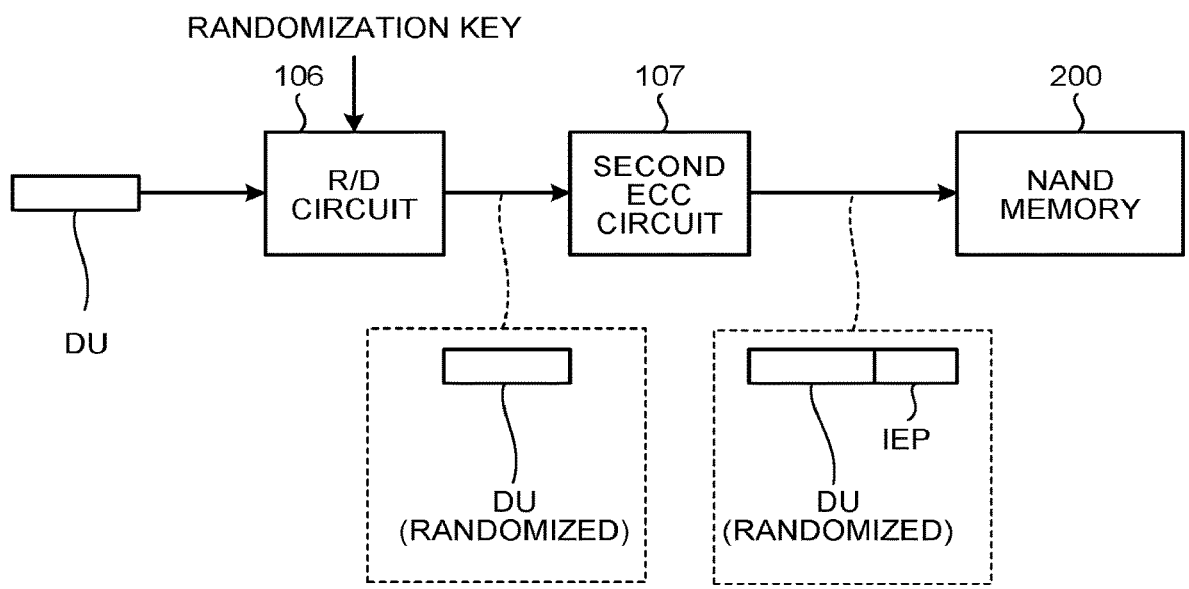
FIG. 7 is a diagram illustrating a process executed by an R/D circuit and a second ECC circuit according to the embodiment.

The various processes that are executed, before user data is written into the NAND memory 200, on the user data will be described with reference to FIGS. 6 and 7. FIG. 6 is a diagram illustrating a process executed by the first ECC circuit 105 according to the embodiment, and FIG. 7 is a diagram illustrating a process executed by the R/D circuit 106 and the second ECC circuit 107 according to the embodiment.

The various processes are executed on user data in an unit of a data unit DU. First, a data unit DU is generated from the user data. For example, the user data is divided into the size of the data unit DU. If the user data has an insufficient size, the user data is padded with invalid data, thereby generating one or more data units DU.

As illustrated in FIG. 6, the generated data unit DU is input to the first ECC circuit 105 and used for the generation of an RS code. The first ECC circuit 105 performs an RS code generating operation using the data unit DU and stores a result of the operation. Then, when a new data unit DU is input to the first ECC circuit 105, the first ECC circuit 105 further performs the RS code generating operation based on the stored operation result and the input new data unit DU. The first ECC circuit 105 is configured to generate an RS code by performing the operation on a predetermined number of data units DU and outputting the generated RS code. The first ECC circuit 105 may perform the RS code generating operation after the predetermined number of data units DU are input to the first ECC circuit 105.

The data unit DU input to the first ECC circuit 105 is output as it is from the first ECC circuit 105. Then, as illustrated in FIG. 7, the output data unit DU is input to the R/D circuit 106 and randomized by the R/D circuit 106. Not the data unit DU output from the first ECC circuit 105, but the data unit DU input to the first ECC circuit 105 may be parallelly input to the R/D circuit 106. In randomizing the data unit DU, a randomization key is input to the R/D circuit 106 from, for example, the processor 101. The R/D circuit 106 generates a pseudo-random number sequence using the input randomization key as a seed and scrambles the data unit DU using the pseudo-random number sequence. For example, the R/D circuit 106 calculates an exclusive OR of the data unit DU and the pseudo-random number sequence and outputs a result of the calculation as the randomized data unit DU. The scrambling calculation is not limited to the exclusive OR.

The randomized data unit DU is input to the second ECC circuit 107. The second ECC circuit 107 generates parity data IEP by executing coding with the BCH code on the randomized data unit DU. Then, the second ECC circuit 107 connects the randomized data unit DU and the generated parity data IEP and outputs the connected data.

The data output from the second ECC circuit 107 is transmitted by the memory I/F 108 to any of the memory chips 201 of the NAND memory 200.

The above various processes that are executed, before a data unit DU generated from user data is written into the NAND memory 200, on the user data corresponds to the first process. Specifically, the coding with the first error correction code (e.g., the RS code in the embodiment) and the first conversion (e.g., the randomization in the embodiment) correspond to the first process. Alternatively, the coding with the first error correction code (e.g., the RS code in the embodiment), the first conversion (e.g., the randomization in the embodiment), and the coding with the second error correction code (e.g., the BCH code in the embodiment) correspond to the first process.

Figure 8:
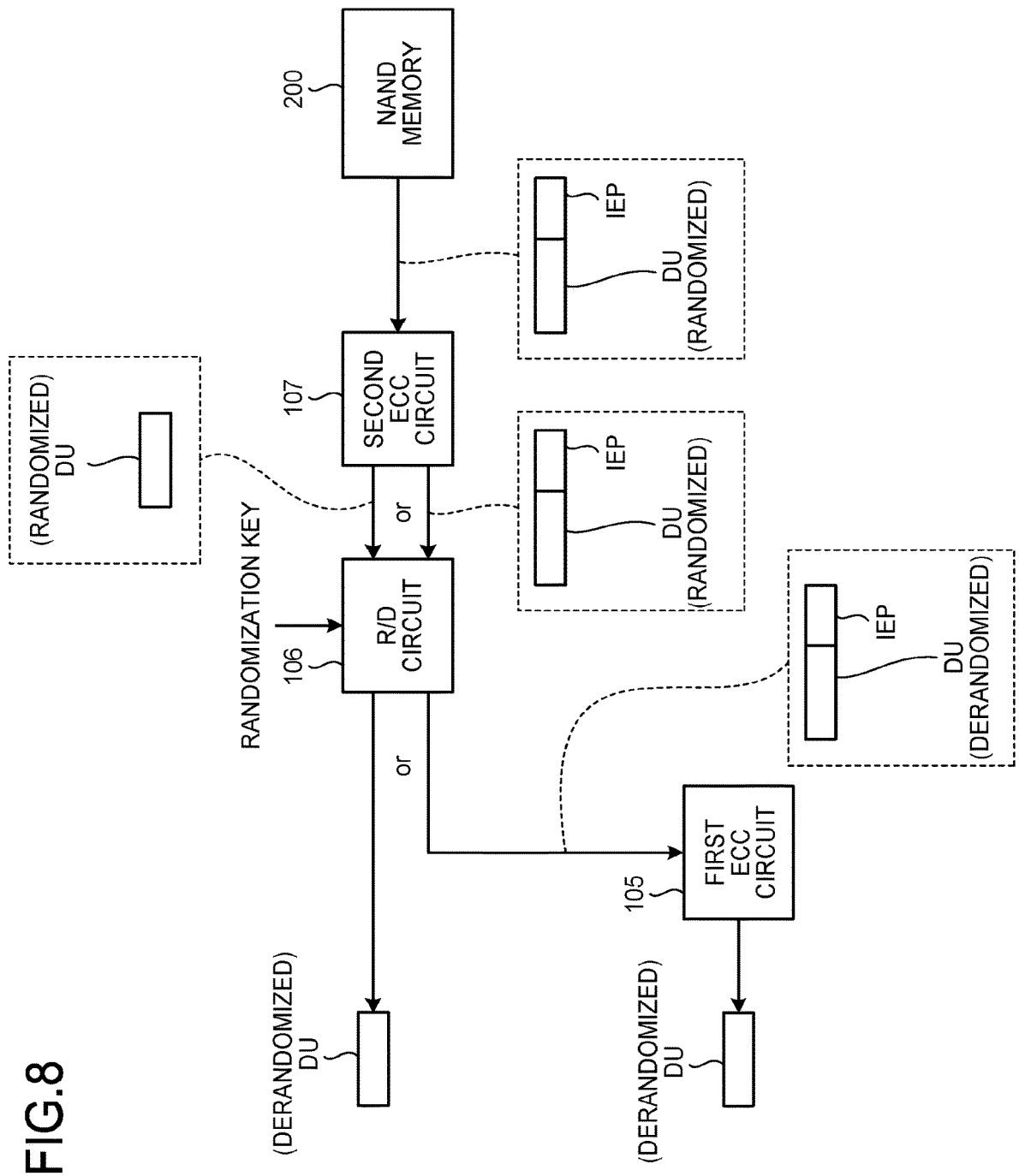
FIG. 8 is a schematic diagram for describing processes executed on user data read from a NAND memory in the embodiment.

FIG. 8 is a schematic diagram for describing various processes that are executed, after user data is read from the NAND memory 200, on the user data.

The controller 100 receives, from the memory chip 201, user data to be read as a data unit DU to be read with parity data IEP connected thereto. The data unit DU with the parity data IEP connected thereto is first input to the second ECC circuit 107. The second ECC circuit 107 executes decoding with the BCH code, that is, error correction using the parity data IEP on the input data unit DU to be read.

After the error correction is executed by the second ECC circuit 107, the data unit DU to be read is derandomized by the R/D circuit 106. In derandomizing the data unit DU to be read, a randomization key is input to the R/D circuit 106 from, for example, the processor 101. The R/D circuit 106 generates a pseudo-random number sequence using the input randomization key as a seed and unscrambles the data unit DU to be read using the pseudo-random number sequence. For example, the R/D circuit 106 calculates an exclusive OR of the data unit DU to be read and the pseudo-random number sequence and outputs a result of the calculation as the unscrambled data unit DU. The unscrambling calculation is not limited to the exclusive OR and may be any calculation corresponding to the scrambling calculation.

The derandomized data unit DU to be read is transmitted to the buffer memory 104.

A data flow described above is a data flow in a case where the second ECC circuit 107 succeeds in the error correction.

When the second ECC circuit 107 fails in the error correction, the first ECC circuit 105 executes error correction.

Specifically, a product code frame PF to which the data unit DU to be read belongs is identified by, for example, the processor 101, and all the RS code frames RSF constituting the identified product code frame PF are read from the memory chip 201. The error correction of the second ECC circuit 107 and the derandomization of the R/D circuit 106 are executed in this order on each of the RS code frames RSF read from the memory chip 201 as with the data unit DU to be read. Then, each of the RS code frames RSF with the parity data IEP connected thereto is input to the first ECC circuit 105. Then, the first ECC circuit 105 tries to perform error correction by decoding using all the RS code frames RSF constituting the product code frame PF.

When the number of RS code frames RSF on which the second ECC circuit 107 has failed in error correction is equal to or less than a predetermined number among all the RS code frames RSF constituting the product code frame PF, the first ECC circuit 105 can correct the error of the data unit DU to be read by erasure correction using the parity data RSP.

When the number of RS code frames RSF on which the second ECC circuit 107 has failed in error correction is more than a predetermined number among all the RS code frames RSF constituting the product code frame PF, the first ECC circuit 105 repeatedly executes the error correction by decoding using the parity data RSP and the error correction by decoding using the parity data IEP until the number of errors becomes less than the predetermined number. The first ECC circuit 105 can correct the error of the data unit DU to be read by erasure correction using the parity data RSP and the parity data IEP.

The erasure correction using the parity data RSP and the erasure correction using the parity data RSP and the parity data IEP which are executed by the first ECC circuit 105 correspond to the first decoding. The decoding using the second parity data (e.g., the parity data IEP in the embodiment) executed by the second ECC circuit 107 corresponds to the second decoding. The derandomization corresponds to the second conversion which is inverse conversion of the first conversion (e.g., the randomization in the embodiment).

The above various processes that are executed, after user data is read from the NAND memory 200, on the user data correspond to the second process. Specifically, the second conversion and the first decoding correspond to the second process. Alternatively, the second decoding, the second conversion, and the first decoding correspond to the second process.

Figure 9:
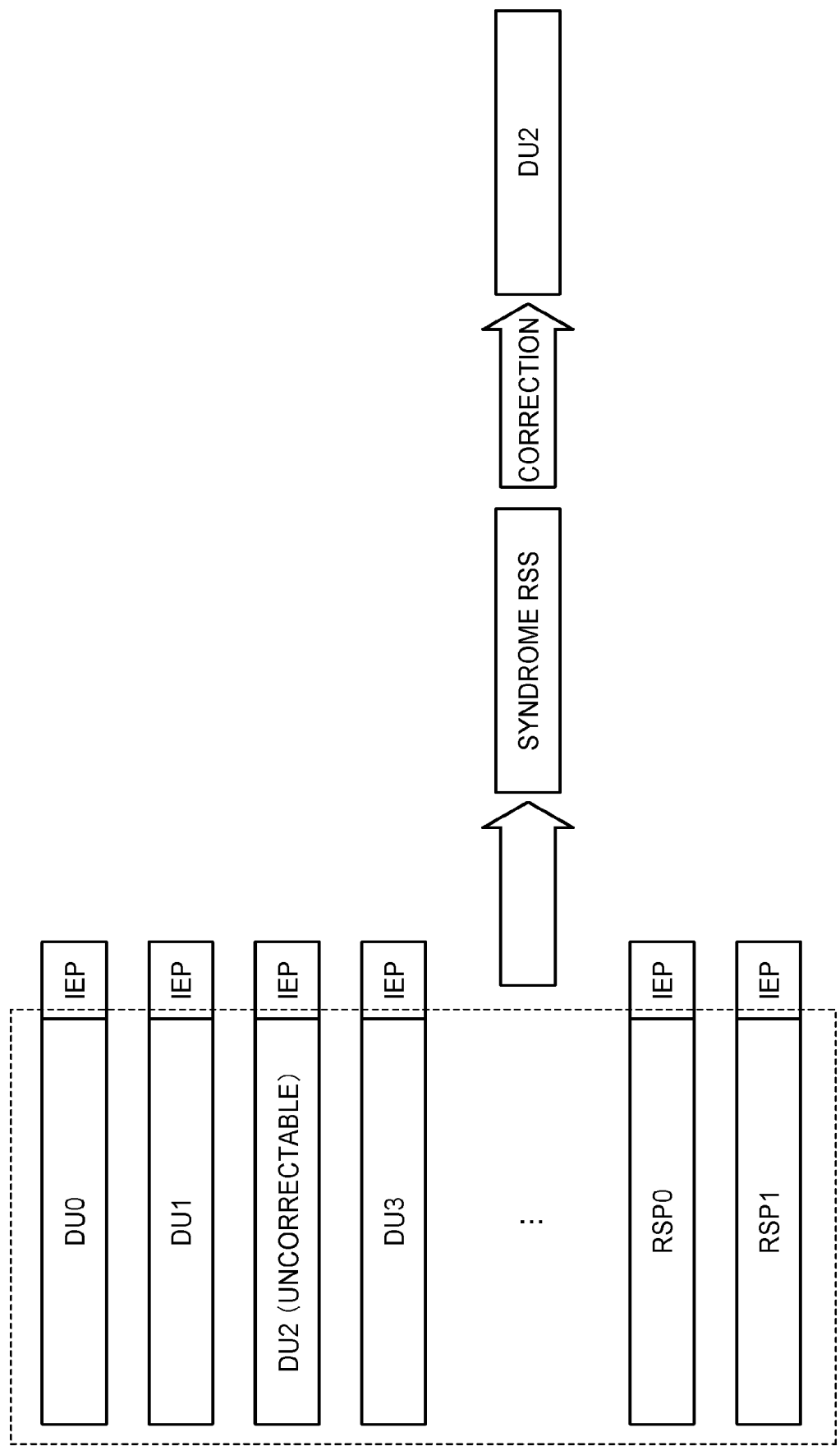
FIG. 9 is a conceptual diagram for describing a process executed by the first ECC circuit according to the embodiment.

FIG. 9 is a conceptual diagram for describing a process executed by the first ECC circuit 105 according to the embodiment. In the example illustrated in FIG. 9, the data unit DU2 is an original data unit DU to be read, and an error included in the data unit DU2 is uncorrectable by the second ECC circuit 107.

As described above, all the RS code frames RSF constituting the product code frame PF to which the data unit DU2 belongs are decoded by the second ECC circuit 107 and derandomized by the R/D circuit 106, and then input to the first ECC circuit 105. The first ECC circuit 105 generates a syndrome RSS based on a set of the input RS code frames RSF. Then, the first ECC circuit 105 executes error correction on the data unit DU2 using the syndrome RSS. The syndrome is the multiplication of a received sequence by a parity check matrix.

The process from the reading of the RS code frame RSF set to the error correction executed by the first ECC circuit 105 corresponds to the first operation.

An incorrect data unit DU may be included in the RS code frame RSF set input to the first ECC circuit 105. The incorrect data unit DU indicates a data unit DU that differs from an expected data unit DU.

Various causes can be considered as a cause of the incorrect data unit DU input to the first ECC circuit 105. Three events that cause the incorrect data unit DU input to the first ECC circuit 105 will be described below.

A first event includes failure of derandomization. In order to correctly execute derandomization, it is necessary to use, in the derandomization, the same randomization key as used in writing a data unit DU. However, different randomization keys may be used in writing a data unit DU and in reading the data unit DU. Such a case may occur, for example, when each randomization key is managed in association with address information (a logical address or a physical address) of user data.

As described above, the relationship between the logical address of user data and the physical address indicating the location of the storage area of the user data is managed using the logical-physical conversion information. However, for reasons of implementation, it is difficult to exactly match the timing of writing the user data into the NAND memory 200 with the timing of updating the logical-physical conversion information. Thus, there may be a period in which the content of the logical-physical conversion information does not correspond to the latest relationship between the logical address and the physical address.

When the RS code frame RSF set is read in such a period, a randomization key that differs from the randomization key used in the writing can be selected. When the randomization key that differs from the randomization key used in the writing is selected, a data unit DU read as one of the RS code frames RSF is changed, by inappropriate derandomization, to a state having a bit string that differs from a bit string in an unrandomized state. That is, an incorrect data unit DU is obtained.

The derandomization is executed after the error correction is executed by the second ECC circuit 107. That is, the state of the data unit DU read as the RS code frame RSF is changed to a state that differs from the state of the original data unit DU by inappropriate derandomization after being brought into a state with no error by the second ECC circuit 107. That is, the data unit DU read as the RS code frame RSF becomes an incorrect data unit DU. The incorrect data unit DU is input to the first ECC circuit 105 after passing through the second ECC circuit 107. Thus, the first ECC circuit 105 treats the incorrect data unit DU as a data unit DU with no error.

A second event includes a soft error or a bus error. During a period from when a data unit DU goes through the error correction executed by the second ECC circuit 107 to when the data unit DU is input to the first ECC circuit 105, when a new error is caused by a soft error or a bus error in the data unit DU, the data unit DU including the error is input to the first ECC circuit 105. That is, the data unit DU read as the RS code frame RSF is input to the first ECC circuit 105 as an incorrect data unit DU that differs from an expected data unit DU after passing through the second ECC circuit 107.

A third event includes an error in reading a data unit DU by the memory chip 201. The memory chip 201 may read a data unit DU from a page that differs from a page designated as a page from which the RS code frame RSF is to be read due to an operation error of the peripheral circuit 210. That is, the memory chip 201 may read a wrong data unit DU. The second ECC circuit 107 and the R/D circuit 106 are not capable of detecting that the input data unit DU is wrong.

Thus, when a wrong data unit DU is read due to a reading error of the memory chip 201, the wrong data unit DU is input, as an incorrect data unit DU, to the first ECC circuit 105.

When an incorrect data unit DU is included in the RS code frame RSF set input to the first ECC circuit 105, a syndrome RSS generated by decoding using the set is incorrect. In this case, the first ECC circuit 105 executes error correction on the data unit DU2 using the incorrect syndrome RSS. In the case where the incorrect syndrome RSS is used, even if the first ECC circuit 105 completes the error correction, the error-corrected data unit DU to be read is not equal to the original data unit DU. That is, the data unit DU to be read cannot be restored to its original state. It is noted that the original state corresponds to state of original data.

Thus, after the error correction is executed by the first ECC circuit 105, the controller 100 determines whether the data unit DU to be read has been restored to its original state. When it is determined that the data unit DU to be read has not been restored to its original state, the controller 100 re-executes the first operation (that is, the process from the reading of the RS code frame RSF set to the error correction executed by the first ECC circuit 105).

The first event described above is caused by a lag between the timing of writing the user data into the NAND memory 200 and the timing of updating the logical-physical conversion information. Thus, the first event can be eliminated in a short period of time. The second event and the third event both occur accidentally. Even if an incorrect data unit DU is input to the first ECC circuit 105 by the first operation due to any of the first to third events, the data unit DU to be read can be restored to its original state when the event does not occur at the time of re-executing the first operation. The controller 100 is configured to re-execute the first operation when the data unit DU to be read cannot be restored to its original state, which increases the possibility that the data unit DU to be read can be restored to its original state.

A parameter that is previously embedded in the data unit DU to be read is used in the determination as to whether the data unit DU to be read has been restored to its original state.

Figure 10:
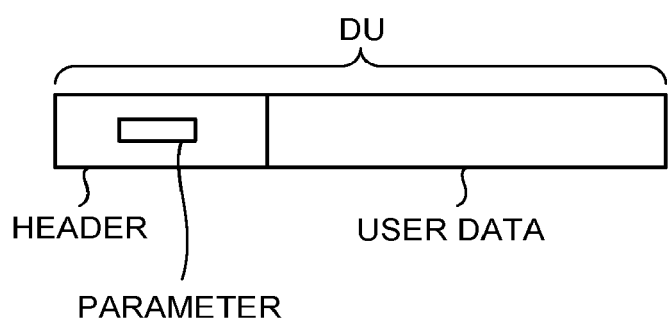
FIG. 10 is a schematic diagram illustrating an example of a configuration of a data unit according to the embodiment.

FIG. 10 is a schematic diagram illustrating an example of a configuration of the data unit DU according to the embodiment. As illustrated in FIG. 10, the data unit DU includes user data and a header attached to the user data. The header includes a parameter. A known value is set to the parameter.

After the first operation is executed on the data unit DU to be read, the processor 101 acquires a value of the parameter from the data unit DU to be read. Then, the processor 101 determines whether the value acquired from the data unit DU to be read is equal to an expected value. When the acquired value and the expected value are equal to each other, the processor 101 determines that the data unit DU to be read has been restored to its original state. When the acquired value and the expected value are not equal to each other, the processor 101 determines that the data unit DU to be read has not been restored to its original state.

Any known value can be set to the parameter. In the embodiment, as an example, a logical address of the user data included in the data unit DU is set to the parameter. The logical address is known information managed by logical-physical information. The processor 101 is configured to acquire the expected value of the parameter by referring to the logical-physical information in the determination as to whether the data unit DU to be read has been restored to its original state.

The value of the parameter corresponds to the first information. In the example of FIG. 10, the parameter is embedded in the header. The position where the parameter is embedded is not limited to the header. For example, the data unit DU may include a footer, and the parameter may be embedded in the footer. In the following description, the parameter is embedded in the header as an example.

Next, an operation of the memory system 1 according to the embodiment will be described.

Figure 11:
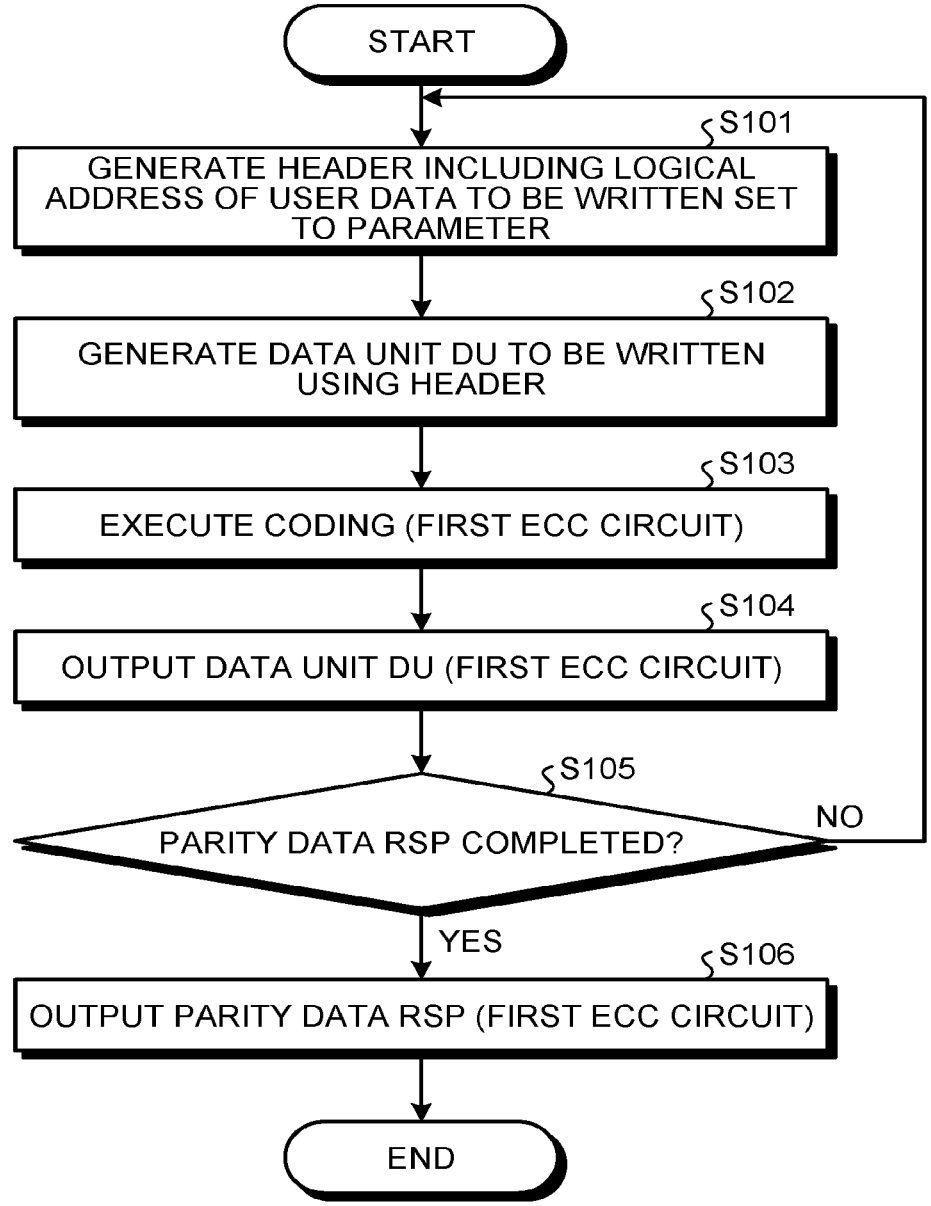
FIG. 11 is a flowchart illustrating an example of a process of generating parity data according to the embodiment.

FIG. 11 is a flowchart illustrating an example of an operation of the controller 100 according to the embodiment, the operation being related to the process of generating the parity data RSP.

The processor 101 selects user data to be written from pieces of user data stored in the buffer memory 104 and generates a header including a logical address of the selected user data to be written, the logical address being set to a parameter (S101).

Then, the processor 101 generates a data unit DU to be written by adding the header to the user data to be written (S102). The processor 101 is capable of dividing or padding the user data to be written so that the size of the data unit DU to be written becomes a predetermined value. In S102, two or more data units DU to be written may be generated from the user data to be written.

Then, the first ECC circuit 105 executes an operation of coding on the data unit DU to be written (S103). Then, the first ECC circuit 105 outputs the data unit DU to be written (S104). As described above, the data unit DU input to the first ECC circuit 105 may be parallelly input to the R/D circuit 106. In this case, the process of S104 can be omitted.

In order to generate parity data RSP, it is necessary to input all data units DU constituting the product code frame PF. That is, when the number of input data units DU has reached the number of data units DU constituting the product code frame PF by inputting the data unit DU to be written, the parity data RSP is completed. When the parity data RSP has been completed (S105: Yes), the first ECC circuit 105 outputs the parity data RSP (S106), and the process of generating the parity data RSP is finished. When the parity data RSP has not been completed (S105: No), the control shifts to S101, and the processes of S101 and thereafter are executed on new user data to be written.

Figure 12:
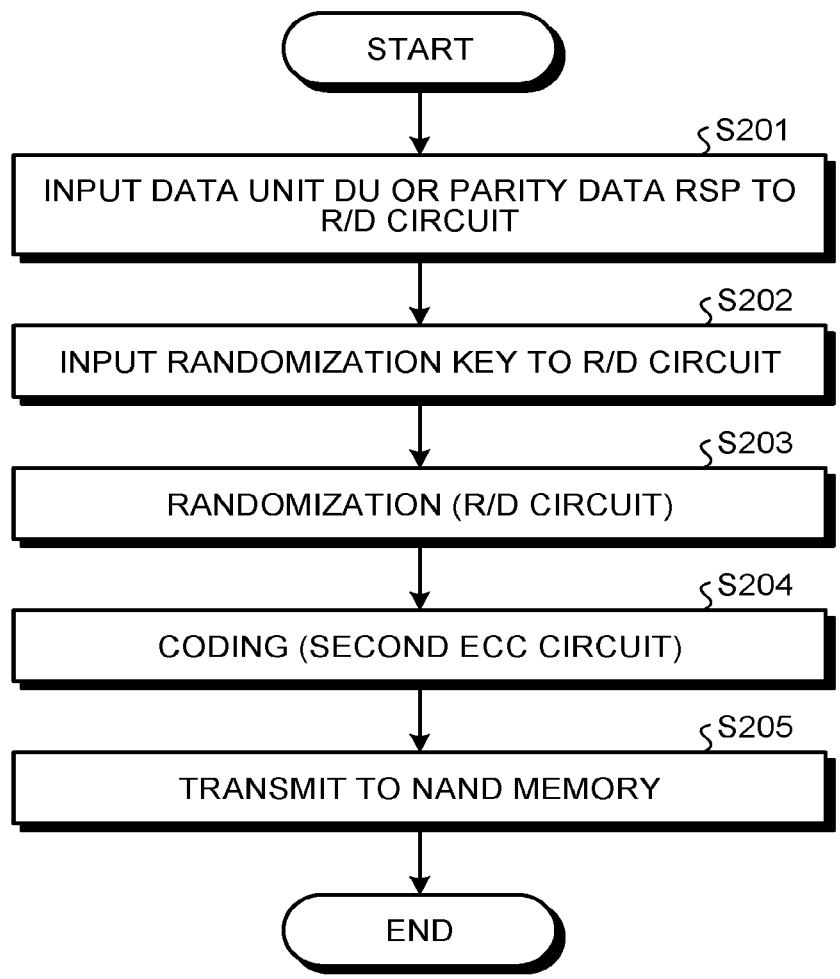
FIG. 12 is a flowchart illustrating an example of a process of writing data into the NAND memory according to the embodiment.

FIG. 12 is a flowchart illustrating an example of an operation of the controller 100 according to the embodiment, the operation being related to the process of writing data into the NAND memory 200.

The processor 101 inputs a data unit DU (e.g., the data unit DU output by the process of S103 of FIG. 11) to the R/D circuit 106 (S201). Then, the processor 101 inputs a randomization key to the R/D circuit 106 (S202), and the R/D circuit 106 executes randomization using the randomization key (S203).

Then, the second ECC circuit 107 executes coding on the randomized data unit DU to be written (S204). The second ECC circuit 107 connects parity data IEP generated by the coding to the randomized data unit DU to be written.

Then, the memory I/F 108 transmits, to the NAND memory 200, the randomized data unit DU to be written with the parity data IEP connected thereto (S205). The process of writing the data unit DU into the NAND memory 200 is completed by S205.

When the first ECC circuit 105 completes coding on all the data units DU constituting the product code frame PF, the parity data RSP is completed (refer to S105 and S106 of FIG. 11). The parity data RSP is transmitted to the NAND memory 200 in accordance with a procedure similar to S201 to S205. The process of writing the parity data RSP into the NAND memory 200 is completed by S205. A method for determining a randomization key used in randomizing the parity data RSP is not limited to any particular method.

Figure 13:
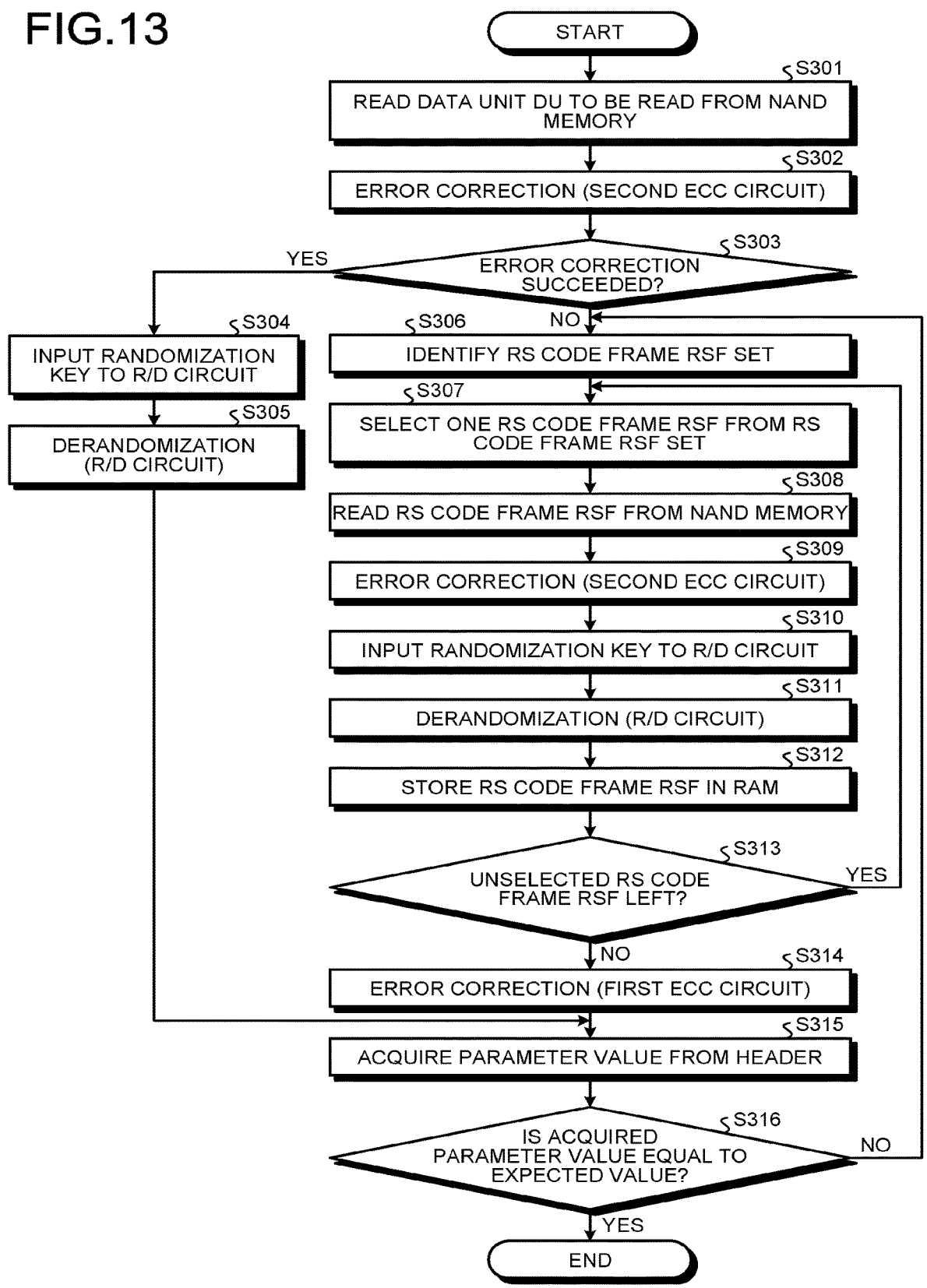
FIG. 13 is a flowchart illustrating an example of a process of reading data according to the embodiment.

FIG. 13 is a flowchart illustrating an example of an operation of the controller 100 according to the embodiment, the operation being related to the process of reading the data unit DU from the NAND memory 200.

First, the memory I/F 108 reads a data unit DU to be read from the NAND memory 200 (S301). The data unit DU to be read is read with parity data IEP connected thereto.

Then, the second ECC circuit 107 executes error correction on the data unit DU to be read by decoding using the parity data IEP (S302).

Then, when the error correction has succeeded in S302 (S303: Yes), the processor 101 inputs a randomization key to the R/D circuit 106 (S304), and the R/D circuit 106 executes derandomization using the randomization key (S305). Then, the control shifts to S315. A process of S315 will be described later.

When the error correction has failed in S302 (S303: No), the first operation is started. The failure of the error correction indicates that the second ECC circuit 107 cannot correct an error of the read data unit DU and fails in restoring the read data unit DU.

In the first operation, the processor 101 first identifies a set of RS code frames RSF constituting a product code frame PF to which the data unit DU to be read belongs (S306).

Then, processes from S308 to S312 are executed on each of the RS code frames RSF. The processor 101 first selects one RS code frame RSF to be a target of the processes from S308 to S312 from the RS code frame RSF set (S307). Then, in S308, the memory I/F 108 reads the selected RS code frame RSF from the NAND memory 200 (S308). The selected RS code frame RSF is read with parity data IEP connected thereto.

Then, the second ECC circuit 107 executes error correction on the RS code frame RSF by decoding using the parity data IEP (S309). Then, the processor 101 inputs a randomization key to the R/D circuit 106 (S310), and the R/D circuit 106 executes derandomization using the randomization key on the RS code frame RSF (S311).

In S309, the processor 101 identifies the randomization key used in randomizing the RS code frame RSF and inputs the identified randomization key to the R/D circuit 106. When the randomization key is managed in association with address information (a logical address or a physical address) of user data and the RS code frame RSF corresponds to a data unit DU, the processor 101 can identify the randomization key based on address information of user data included in the data unit DU. A method for identifying the randomization key is not limited to this method. When the RS code frame RSF is parity data RSP, the randomization key can be identified by any method.

After S311, the processor 101 stores the derandomized RS code frame RSF into the RAM 103 (S312) and determines whether one or more unselected RS code frames RSF is left (S313).

When one or more unselected RS code frames RSF is left (S313: Yes), the control shifts to S307, and one new RS code frame RSF is selected from the one or more unselected RS code frame RSF.

When no unselected RS code frame RSF is left (S313: No), the first ECC circuit 105 executes error correction, by decoding using the derandomized RS code frame RSF set stored in the RAM 103, on the data unit DU to be read on which the second ECC circuit 107 has failed in error correction (S314). In S314, the first ECC circuit 105 may execute erasure correction or may repeatedly execute decoding using the parity data RSP and decoding using the parity data IEP.

Then, the processor 101 acquires a value of the parameter included in the header from the data unit DU to be read that has executed (or undergone) the error correction executed by the first ECC circuit 105 (S315). Then, the processor 101 determines whether the acquired parameter value is equal to the logical address of the user data included in the data unit DU to be read, that is, an expected value of the parameter (S316).

When the acquired parameter value is equal to the expected value (S316: Yes), the user data is taken out of the data unit DU to be read that has been error-corrected by the first ECC circuit 105, and the operation related to the process of reading the data unit DU from the NAND memory 200 is completed.

When the acquired parameter value is not equal to the expected value (S316: No), it is estimated that the data unit DU to be read has not been restored to its original state. Thus, the control shifts to S306, and the first operation is re-executed.

In the description of FIG. 13, the first operation is repeatedly executed until Yes is determined in the determination of S316. The number of executions of the first operation may be limited to a predetermined number.

When No is determined in the process of S316 after the process of S305, a process that differs from the process that is executed when the process of S316 is executed after the process of S314 and No is determined in S316 may be executed. When No is determined in the process of S316 after the process of S305, for example, a determination voltage that is applied to a gate electrode when data is read from the memory cell transistor MT may be shifted, and the process of S301 may be executed again. Executing S301 with the shifted determination voltage is also referred to as retry read. A method for determining the determination voltage used in the retry read is not limited to any particular method. For example, the determination voltage may be selected from a plurality of previously-set candidates. Alternatively, a voltage value that enables minimization of the number of errors included in the data units DU to be read may be obtained by executing a plurality of reads using different voltage values as the determination voltage, and the obtained voltage may be set as the determination voltage used in the retry read.

As described above, according to the embodiment, the NAND memory 200 stores a plurality of data units DU that has executed (or undergone) the first process. Each of the data units DU includes a parameter, and a value that can be subjected to comparison later (an example of the first information) is set to the parameter. The first process includes the coding with the RS code (an example of the first coding) that generates the parity data RSP (an example of the first parity data) based on the data units DU and the randomization (an example of the first conversion) executed after the coding with the RS code. The controller 100 executes the first operation. The first operation includes reading the data units DU from the NAND memory 200 and executing the second process on the read data units DU. The second process includes the derandomization (an example of the second conversion) and the decoding (an example of the first decoding) using the parity data RSP and the derandomized data units DU. The controller 100 acquires a value of the parameter from a data unit DU to be read among the data units DU that have executed (or undergone) the first operation. The controller 100 compares the acquired value with the expected value of the parameter and, when the acquired value and the expected value are not equal to each other, re-executes the first operation.

Thus, the controller 100 can detect failure in restoring the data unit DU to be read by the first operation. The controller 100 can re-execute the first operation when the restoration of the data unit DU to be read by the first operation fails. When an event that causes the failure does not occur again at the time of re-executing the first operation, the controller 100 can correctly restore the data unit DU to be read in the re-execution of the first operation. That is, the embodiment improves the ability of restoring data read from the NAND memory 200.

According to the embodiment, the first process further includes, after the randomization, the coding that generates the parity data IEP for each of the data units DU (an example of the second coding). The second process further includes, before the derandomization, the decoding using the parity data IEP (second decoding).

When the derandomization on one of the data units DU fails, an incorrect data unit DU is generated. The incorrect data unit DU generated due to the failure of the derandomization is used in the error correction with the RS code, thereby causing failure of the restoration of the data unit DU to be read. According to the embodiment, the memory system 1 can detect failure of the restoration caused by such an event. When the derandomization succeeds in the re-execution of the first operation, the memory system 1 can correctly restore the data unit DU to be read in the re-execution of the first operation.

According to the embodiment, the controller 100 reads the data unit DU to be read from the NAND memory 200 and executes decoding using the parity data IEP on the data unit DU to be read. The controller 100 executes the first operation when the decoding using the parity data IEP fails.

According to the embodiment, the randomization is performed as an example of the first conversion, and the derandomization is performed as an example of the second conversion. Specifically, the randomization is a process including generating a pseudo-random number sequence for each data unit DU and scrambling the data unit DU using the corresponding pseudo-random number sequence. The derandomization is a process including generating a pseudo-random number sequence for each data unit DU and unscrambling the data unit DU using the corresponding pseudo-random number sequence.

Note that the first conversion and the second conversion are not limited thereto. Any conversion process can be employed as the first conversion in addition to or instead of the randomization. Any conversion process can be employed as the second conversion in addition to or instead of the derandomization.

An example of the process that can be employed as the first conversion in addition to or instead of the randomization includes error mitigation coding (EMC). An example of the process that can be employed as the second conversion in addition to or instead of the derandomization includes error mitigation decoding.

According to the embodiment, the logical address is employed as the first information that is set to the parameter. The first information is not limited to the logical address. Any known information can be employed as the first information.

An example in which the second coding, the second decoding, the first conversion, and the second conversion are performed has been described above. Some or all of the second coding, the second decoding, the first conversion, and the second conversion may not be necessarily performed.

For example, the conversion process such as randomization and the second coding may not be executed on the data units DU as long as the first coding is executed thereon. In such a case, the controller 100 performs error correction by the first decoding in the first operation to restore the data unit DU. Also in such a case, the controller 100 can detect failure of the restoration of the data unit DU to be read by the first operation. The controller 100 can re-execute the first operation when the restoration of the data unit DU to be read by the first operation fails. When an event that causes the failure does not occur again at the time of re-executing the first operation, the controller 100 can correctly restore the data unit DU to be read in the re-execution of the first operation. That is, the ability of restoring data read from the NAND memory 200 is improved.

In the above description, the coding with the first error correction code and the decoding corresponding thereto are executed by the first ECC circuit 105, and the coding with the second error correction code and the decoding corresponding thereto are executed by the second ECC circuit 107. Some or all of these coding and decoding operations may be executed by the processor 101.

Furthermore, some or all of the processes executed by the processor 101 in the above description may be executed by a hardware circuit. Alternatively, some or all of the processes executed by the processor 101 in the above description may be executed by a field-programmable gate array (FPGA) or an application specific integrated circuit (ASIC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory configured to store a plurality of first data units, the plurality of first data units corresponding to a plurality of second data units that has executed a first process, the first process including first coding that generates first parity data based on the plurality of second data units and first conversion executed after the first coding, each of the plurality of second data units including first information; and
   a controller configured to:
   execute a first operation, the first operation including reading the plurality of first data units from the nonvolatile memory and executing a second process on a plurality of third data units, the plurality of third data units corresponding to the read plurality of first data units, the second process including second conversion and first decoding, the second conversion being inverse conversion of the first conversion, the first decoding using the first parity data and the plurality of third data units that has executed the second conversion,
   acquire second information from a fourth data unit, the second information corresponding to the first information of the fourth data unit, the fourth data unit being one of a plurality of fifth data units, the plurality of fifth data units corresponding to the plurality of third data units that has executed the first operation, compare third information that is an expected value of the second information, with the second information acquired from the fourth data unit, and re-execute the first operation when the third information and the second information are not equal.

2. The memory system according to claim 1, wherein the first process further includes, after the first conversion, second coding that generates second parity data for each of the plurality of second data units, and the second process further includes, before the second conversion, second decoding using the second parity data.

3. The memory system according to claim 2, wherein the controller is configured to read, from the nonvolatile memory, a sixth data unit corresponding to the fourth data unit among the plurality of first data units, execute the second decoding on the read sixth data unit, and execute the first operation when the second decoding fails.

4. The memory system according to claim 3, wherein the first conversion is a process including generating a pseudo-random number sequence for each of the plurality of second data units and scrambling, using the corresponding pseudo-random number sequence, each of the plurality of second data units that has executed the first coding, and the second conversion is a process including generating a pseudo-random number sequence for each of the plurality of third data units and unscrambling, using the corresponding pseudo-random number sequence, each of the plurality of third data units that has executed the second conversion.

5. The memory system according to claim 2, wherein the first conversion is a process including generating a pseudo-random number sequence for each of the plurality of second data units and scrambling, using the corresponding pseudo-random number sequence, each of the plurality of second data units that has executed the first coding, and the second conversion is a process including generating a pseudo-random number sequence for each of the plurality of third data units and unscrambling, using the corresponding pseudo-random number sequence, each of the plurality of third data units that has executed the second conversion.

6. The memory system according to claim 1, wherein the first conversion is a process including generating a pseudo-random number sequence for each of the plurality of second data units and scrambling, using the corresponding pseudo-random number sequence, each of the plurality of second data units that has executed the first coding, and the second conversion is a process including generating a pseudo-random number sequence for each of the plurality of third data units and unscrambling, using the corresponding pseudo-random number sequence, each of the plurality of third data units that has executed the second conversion.

7. The memory system according to claim 1, wherein when the memory system is connected to a host, the first information is locational information designated by the host.

8. The memory system according to claim 7, wherein the controller is configured to acquire the third information from fourth information that manages a correspondence between the first information of each of the plurality of second data units and a storage location of each of the plurality of first data units in the nonvolatile memory.

9. A memory system comprising:

a nonvolatile memory configured to store a plurality of first data units, the plurality of first data units corresponding to a plurality of second data units that has executed a first process, the first process including first coding that generates first parity data based on the plurality of second data units, each of the plurality of second data units including first information; and a controller is configured to:

execute a first operation, the first operation including reading the plurality of first data units from the nonvolatile memory and executing a second process on a plurality of third data units, the plurality of third data units corresponding to the read plurality of first data units, the second process including first decoding that performs error correction using the first parity data and the plurality of third data units, acquire second information from a fourth data unit, the second information corresponding to the first information of the fourth data unit, the fourth data unit being one of a plurality of fifth data units, the plurality of fifth data units corresponding to the plurality of third data units that has executed the first operation, compare third information that is an expected value of the second information, with the second information acquired from the fourth data unit, and re-execute the first operation when the third information and the second information are not equal.

10. The memory system according to claim 9, wherein the first process further includes, after the first coding, second coding that generates second parity data for each of the plurality of second data units, and the second process further includes, before the first decoding, second decoding using the second parity data.

11. The memory system according to claim 10, wherein the controller is configured to read, from the nonvolatile memory, a sixth data unit corresponding to the fourth data unit among the plurality of first data units, executes the second decoding on the read sixth data unit, and executes the first operation when the second decoding fails.

12. The memory system according to claim 9, wherein when the memory system is connected to a host, the first information is locational information designated by the host.

13. The memory system according to claim 12, wherein the controller is configured to acquire the third information from fourth information that manages a correspondence between the first information of each of the plurality of second data units and a storage location of each of the plurality of first data units in the nonvolatile memory.

14. A method for controlling a memory system, the memory system including a nonvolatile memory configured to store a plurality of first data units, the plurality of first data units corresponding to a plurality of second data units that has executed a first process, the first process including first coding that generates first parity data based on the plurality of second data units and first conversion executed after the first coding, each of the plurality of second data units including first information, the method comprising:

reading the plurality of first data units from the nonvolatile memory;

executing second conversion on a plurality of third data units, the second conversion being an inverse conversion of the first conversion, the plurality of third data units corresponding to the read plurality of first data units;

executing first decoding using the first parity data and the plurality of third data units that has executed the second conversion;

acquiring second information from a fourth data unit, the second information corresponding to the first information of the fourth data unit, the fourth data unit being one of a plurality of fifth data units, the plurality of fifth data units corresponding to the plurality of third data units that has executed the first decoding;

comparing third information that is an expected value of the second information, with the second information acquired from the fourth data unit; and re-executing the reading the plurality of first data units, the executing the second conversion, and the executing the first decoding, when the third information and the second information are not equal.

15. The method according to claim 14, wherein
the first process further includes, after the first conversion, second coding that generates second parity data for each of the plurality of second data units, and
the method further comprises executing second decoding using the second parity data before the second conversion.

16. The method according to claim 15, further comprising:
reading, from the nonvolatile memory, a sixth data unit corresponding to the fourth data unit among the plurality of first data units;
executing the second decoding on the read sixth data unit; and
executing the reading the plurality of first data units, the second conversion, and the first decoding, when the second decoding fails.

17. The method according to claim 15, wherein
the first conversion is a process including generating a pseudo-random number sequence for each of the plurality of second data units and scrambling, using the corresponding pseudo-random number sequence, each of the plurality of second data units that has executed the first coding, and
the second conversion is a process including generating a pseudo-random number sequence for each of the plurality of third data units and unscrambling, using the corresponding pseudo-random number sequence, each of the plurality of third data units that has executed the second conversion.

18. The method according to claim 14, wherein
the first conversion is a process including generating a pseudo-random number sequence for each of the plurality of second data units and scrambling, using the corresponding pseudo-random number sequence, each of the plurality of second data units that has executed the first coding, and
the second conversion is a process including generating a pseudo-random number sequence for each of the plurality of third data units and unscrambling, using the corresponding pseudo-random number sequence, each of the plurality of third data units that has executed the second conversion.

19. The method according to claim 14, wherein when the memory system is connected to a host, the first information is locational information designated by the host.

20. The method according to claim 19, further comprising acquiring the third information from fourth information that manages a correspondence between the first information of each of the plurality of second data units and a storage location of each of the plurality of first data units in the nonvolatile memory.

* * * * *